United States Patent
Mahler et al.

(10) Patent No.: US 9,592,758 B2
(45) Date of Patent: Mar. 14, 2017

(54) SEAT FOR A DRIVER OF A CONSTRUCTION MACHINE

(71) Applicant: Hamm AG, Tirschenreuth (DE)

(72) Inventors: Gerhard Mahler, Windischeschenbach (DE); Axel Roemer, Tirschenreuth (DE); Dieter Stoecklein, Pechbrunn (DE)

(73) Assignee: Hamm AG (DE)

( * ) Notice: Subject to any disclaimer, the term of this patent is extended or adjusted under 35 U.S.C. 154(b) by 0 days.

(21) Appl. No.: 14/714,498

(22) Filed: May 18, 2015

(65) Prior Publication Data
US 2015/0360593 A1    Dec. 17, 2015

(30) Foreign Application Priority Data
May 19, 2014   (DE) .................. 10 2014 209 462

(51) Int. Cl.
*A47C 7/54*     (2006.01)
*B60N 2/46*     (2006.01)
(Continued)

(52) U.S. Cl.
CPC .......... *B60N 2/4633* (2013.01); *B60N 2/062* (2013.01); *B60N 2/24* (2013.01); *B60N 2/464* (2013.01);
(Continued)

(58) Field of Classification Search
CPC .... B60N 2/4606; B60N 2/4693; B60N 2/468; B60N 2/46; B60N 2/462; B60N 2/50;
(Continued)

(56) References Cited

U.S. PATENT DOCUMENTS 4,200,166 A * 4/1980 Hansen ................ B60N 2/4693
                                                  180/315
4,702,520 A * 10/1987 Whisler ............... B60N 2/4633
                                                  180/333
(Continued)

FOREIGN PATENT DOCUMENTS

DE            4207914 A1    9/1993
DE       102008018458 A1   10/2009
(Continued)

OTHER PUBLICATIONS

European Search Report in corresponding European Patent Application EP 15 16 6979, dated Sep. 9, 2015, 3 pp. (not prior art).

*Primary Examiner* — Chi Q Nguyen
(74) *Attorney, Agent, or Firm* — Lucian Wayne Beavers; Patterson Intellectual Property Law PC

(57) ABSTRACT

In a seat (1) for a driver of a construction machine, in particular for a road roller, featuring a seat surface (2), a seat backrest (4) which feature a vertical central plane (26) in longitudinal direction, and featuring no less than one armrest (10) attached in an adjustable basic position by means of an armrest support (8), where the armrest (10) extends from the seat backrest (4) next to the seat surface (2) towards the front, it is provided for the following features to be achieved: a seat console (6) carries, as a minimum, the seat surface (2) and the seat backrest (4), and the armrest support (8) features no less than one each first adjustable connection unit (12) to the armrest (10) and one each second adjustable connection unit (14) to the seat console (6).

20 Claims, 6 Drawing Sheets

(51) Int. Cl.
   *B60N 2/24* (2006.01)
   *B60N 2/06* (2006.01)
   *B60N 2/50* (2006.01)
   *E02F 9/16* (2006.01)
   *B66C 13/56* (2006.01)
   *B66C 13/54* (2006.01)

(52) U.S. Cl.
   CPC ......... *B60N 2/4606* (2013.01); *B60N 2/4646* (2013.01); *B60N 2/4653* (2013.01); *B60N 2/4693* (2013.01); *B60N 2/46* (2013.01); *B60N 2/468* (2013.01); *B60N 2/4626* (2013.01); *B60N 2/50* (2013.01); *B66C 13/54* (2013.01); *B66C 13/56* (2013.01); *E02F 9/166* (2013.01)

(58) Field of Classification Search
   CPC .. Y10T 74/20396; E02F 9/2004; E02F 9/166; B66C 13/54; B66C 13/56
   USPC .................. 297/217.3, 411.32, 463.1, 183.9; 180/315, 333, 331, 332, 334, 335, 336; 172/781; 74/491
   See application file for complete search history.

(56) References Cited

U.S. PATENT DOCUMENTS

| | | | | |
|---|---|---|---|---|
| 4,895,040 | A * | 1/1990 | Soederberg | B66F 9/20 180/315 |
| 5,379,663 | A | 1/1995 | Hara | |
| 5,927,815 | A | 7/1999 | Nakamura et al. | |
| 5,938,282 | A * | 8/1999 | Epple | B60N 2/4693 180/315 |
| 6,039,141 | A * | 3/2000 | Denny | B60N 2/14 180/329 |
| 6,086,142 | A * | 7/2000 | Simmons | B60N 2/146 296/190.01 |
| 6,164,285 | A * | 12/2000 | Garberg | B60K 20/00 180/324 |
| 6,715,269 | B2 * | 4/2004 | Nanlawala | A01D 41/12 180/329 |
| 7,059,680 | B2 * | 6/2006 | Billger | B60N 2/0224 297/217.2 |
| 7,520,567 | B2 * | 4/2009 | Billger | A47C 3/18 180/330 |
| 7,857,090 | B2 * | 12/2010 | Ruhter | B60N 2/4606 172/781 |
| 7,878,288 | B2 * | 2/2011 | Kostak | B60N 2/4606 180/329 |
| 7,913,798 | B2 * | 3/2011 | Frett | B60N 2/4606 172/781 |
| 8,388,262 | B2 | 3/2013 | Klein et al. | |
| 8,424,632 | B2 * | 4/2013 | Ruhter | B60N 2/4606 180/320 |
| 8,434,562 | B2 * | 5/2013 | Miyasaka | E02F 5/32 172/431 |
| 2003/0184123 | A1 | 10/2003 | Amamiya et al. | |
| 2003/0230447 | A1 * | 12/2003 | Wulfert | B60N 2/143 180/329 |
| 2006/0000656 | A1 * | 1/2006 | Bisick | B60N 2/4606 180/272 |
| 2006/0021819 | A1 * | 2/2006 | Shearer | E02F 9/2004 180/321 |
| 2006/0042857 | A1 * | 3/2006 | Catton | B60N 2/4693 180/334 |
| 2006/0061177 | A1 * | 3/2006 | Billger | A47C 3/18 297/344.21 |
| 2007/0017728 | A1 | 1/2007 | Sano | |
| 2009/0223092 | A1 * | 9/2009 | Harber | B60N 2/4606 37/381 |
| 2009/0223733 | A1 * | 9/2009 | Ruhter | B60N 2/4606 180/315 |
| 2009/0223734 | A1 * | 9/2009 | Frett | B60N 2/4606 180/333 |
| 2011/0127819 | A1 * | 6/2011 | Wada | B60N 2/06 297/344.1 |
| 2011/0236130 | A1 | 9/2011 | Klein et al. | |

FOREIGN PATENT DOCUMENTS

| | | |
|---|---|---|
| DE | 102010013041 A1 | 9/2011 |
| WO | 2004106108 A1 | 12/2004 |

* cited by examiner

SEAT FOR A DRIVER OF A CONSTRUCTION MACHINE

BACKGROUND OF THE INVENTION

1. Field of the Invention

The invention relates to a seat for a driver of a construction machine, in particular for a road roller, as well as to a construction machine featuring such a seat.

2. Description of the Prior Art

An adjustable armrest for a driver's seat featuring an armrest support is known from WO 2004/106108, where said armrest support enables the armrest to be adjusted about multiple pivoting axes.

SUMMARY OF THE INVENTION

It is the object of the invention to improve a seat or a construction machine, respectively, to the effect that, by means of a simple and stable design, the armrest position can be altered in variety of ways.

In a seat for a driver of a construction machine, in particular for a road roller, featuring a seat surface, a seat backrest which feature a vertical central plane in longitudinal direction, and featuring no less than one armrest attached in an adjustable basic position by means of an armrest support, where said armrest extends from the seat backrest next to the seat surface towards the front, the invention advantageously provides for a seat console to carry, as a minimum, the seat surface and the seat backrest and for the armrest support to feature no less than one each first adjustable connection unit to the armrest and one each second adjustable connection unit to the seat console.

Such a design featuring an adjustable connection unit to the armrest and a further adjustable connection unit to the seat console enables a simple and stable design which allows the armrest position to be altered in a variety of ways.

It is preferably intended for the armrest to be attached, in an adjustable fashion, to the armrest support via the first or second connection unit for adjusting a basic setting with regard to a lateral pivoting angle relative to a parallel to the vertical central plane about a single first axis preferably in the area of the end of the armrest facing the seat backrest.

The driver can advantageously adjust the basic setting of the armrest with regard to a lateral pivoting angle and adapt the same to his body posture. The adjustment can be performed via the connection unit assigned to the armrest or the seat console, respectively. Pivoting is effected about an almost vertical axis or an axis slightly inclined, for example, parallel to the seat backrest in which design the lateral pivoting angle refers to a parallel to the vertical central plane through the seat extending in longitudinal direction.

In a preferred embodiment, it is intended for the armrest to be pivotable, via the first or second connection unit, about the first axis or about an axis extending parallel to the first axis, beyond the basic position laterally outwards against a resetting force or in a snap-in fashion.

The armrest can additionally be advantageously pivoted outwards beyond the basic position in a reversible or snap-in fashion in order to, for example, provide the driver with a better downward view laterally, should the need arise.

In a preferred further development of the invention, it is intended for the first connection unit to be of two-part design and to be arranged at the upper end of the armrest support, where an upper part is connected to the armrest in a non-rotatable fashion and a lower part is attached, in an adjustable lateral basic setting, to the armrest support in a non-rotatable fashion. In this design, the upper part can be pivoted, with the armrest, relative to the lower part against a resetting force or in a snap-in fashion.

Such a design enables flexible adjustment at a maximum degree of stability.

It is intended for the armrest, starting from a basic setting permanently adjustable in a first range of 0° to 15°, preferably 0° to 10°, to be additionally pivotable about an amount of up to 10°, preferably up to 8°, in a resettable or snap-in fashion.

In a preferred embodiment, it is intended for the armrest, together with the armrest support, to be pivotable, via the second connection unit positioned at the lower end of the armrest support at the seat console, about a second axis extending essentially orthogonally to the central plane until reaching a folded-up resting position.

The seat thus enables the armrest to be folded up together with the armrest support in order to facilitate the accessibility of the seat also from the side featuring said armrest.

In this design, it is preferably intended for the armrest to be pivotable, together with the armrest support, about up to 90°, preferably up to approx. 70°, into the folded-up resting position.

In a preferred embodiment, it is intended for the armrest to be adjustable in inclination, via the second connection unit positioned at the lower end of the armrest support at the seat console, about the second axis extending essentially orthogonally to the central plane.

The design of the armrest support thus enables to additionally also adjust the inclination angle of the armrest so that the armrest can be adjusted by the driver to an individual position comfortable for him that is ergonomic and prevents body tensions.

In this design, it is preferably intended for the armrest to be inclinable downwards by up to 15°, preferably up to 10°.

The armrest may be attached at the armrest support, preferably in the direction of the first axis, in a height-adjustable fashion. A height adjustment is thus additionally implemented which may particularly preferably be combined with the adjustment device for the lateral pivoting angle. In this design, the first connection unit is shiftable in height in the armrest support by a predetermined amount of, for example, 10 cm, and is lockable in a desired position.

To this end, it is preferably intended for the first or second connection unit to feature a clamping sleeve which encloses a cylindrical part of the armrest support and is unlockable or lockable, respectively, via a handling device, preferably a rotating knob or lever, in order to adjust the armrest in height preferably in the direction of the first axis.

In a preferred embodiment, it is intended for the cylindrical part of the armrest support to comprise an oblong hole extending in the direction of the first axis, in which design the oblong hole limits, on the one hand, the height adjustment and, on the other hand, the lateral adjustment of the armrest about the first axis by means of a limiting element engaging into the oblong hole.

The cylindrical part may, at least in part, be formed of a hollow cylinder.

It is preferably intended for the devices for adjusting the pivoting angle in the basic setting to be integrated in the upper first connection unit, in connection with the cylindrical part of the armrest support, for further pivoting of the armrest beyond the basic setting and for height adjustment.

This enables a compact and stiff design of the armrest support.

To this effect, it may additionally be intended for the joint for the second axis and the inclination adjustment device to be integrated in the lower second connection unit.

Operating and indication devices and/or an additional display may be integrated in the armrest.

The seat console may be movable, orthogonally to the central plane, across a platform of the construction machine.

The invention furthermore relates to a construction machine, in particular a road roller, featuring the previously described seat.

In the following, one embodiment of the invention is explained in more detail with reference to the drawings.

BRIEF DESCRIPTION OF THE DRAWINGS

The following is shown.

DETAILED DESCRIPTION

Figure 1:
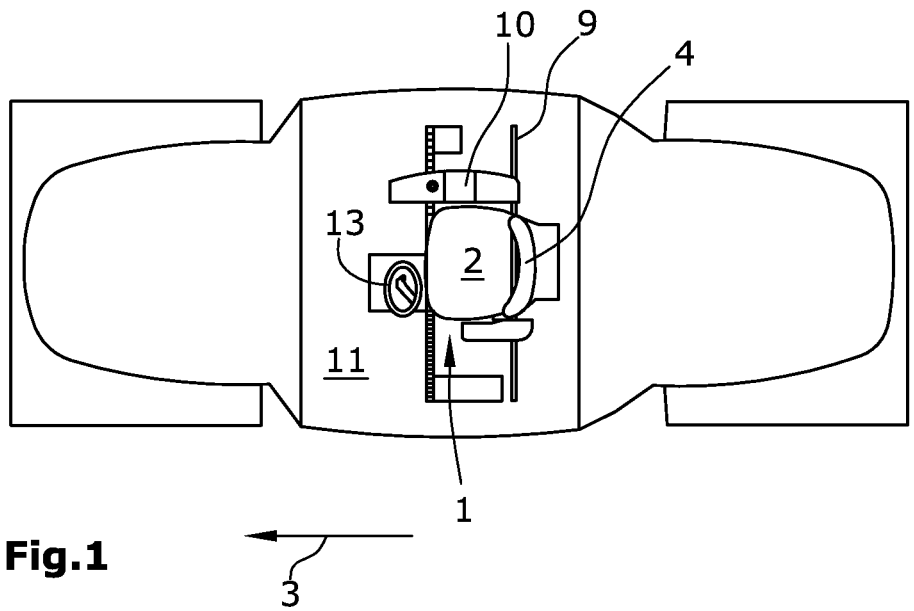
FIG. 1 a top view of a road roller with integrated seat,
FIG. 2 a perspective view of the seat,
FIGS. 3a top views of the seat with different armrest positions, to 5a
FIG. 3b perspective views of the armrest supports in positions which correspond to 5b to FIGS. 3a to 5a,
FIG. 6 a section of the armrest support in side view,
FIG. 7 a section of the armrest support in top view,
FIG. 8 the inclination adjustment device, and
FIG. 9 the folding function of the armrest.

FIG. 1 shows a schematic top view of a road roller featuring a seat 1 shiftable, as a minimum, transverse to the direction of travel on a platform 11 of an operator's stand. The seat 1 comprises a seat surface 2 facing in the direction of travel 3, said seat surface 2 being limited towards the rear by a seat backrest 4. The seat surface 2 is mounted on a seat console 6 which is attached on a movable seating carriage which is movable, along no less than one guiding device 9, transverse to the direction of travel 3 by means of an electrical drive and a control device 16. The seat surface 2 and the seat backrest 4 feature a vertical central plane 26 which extends parallel to the direction of travel 3.

Figure 2:
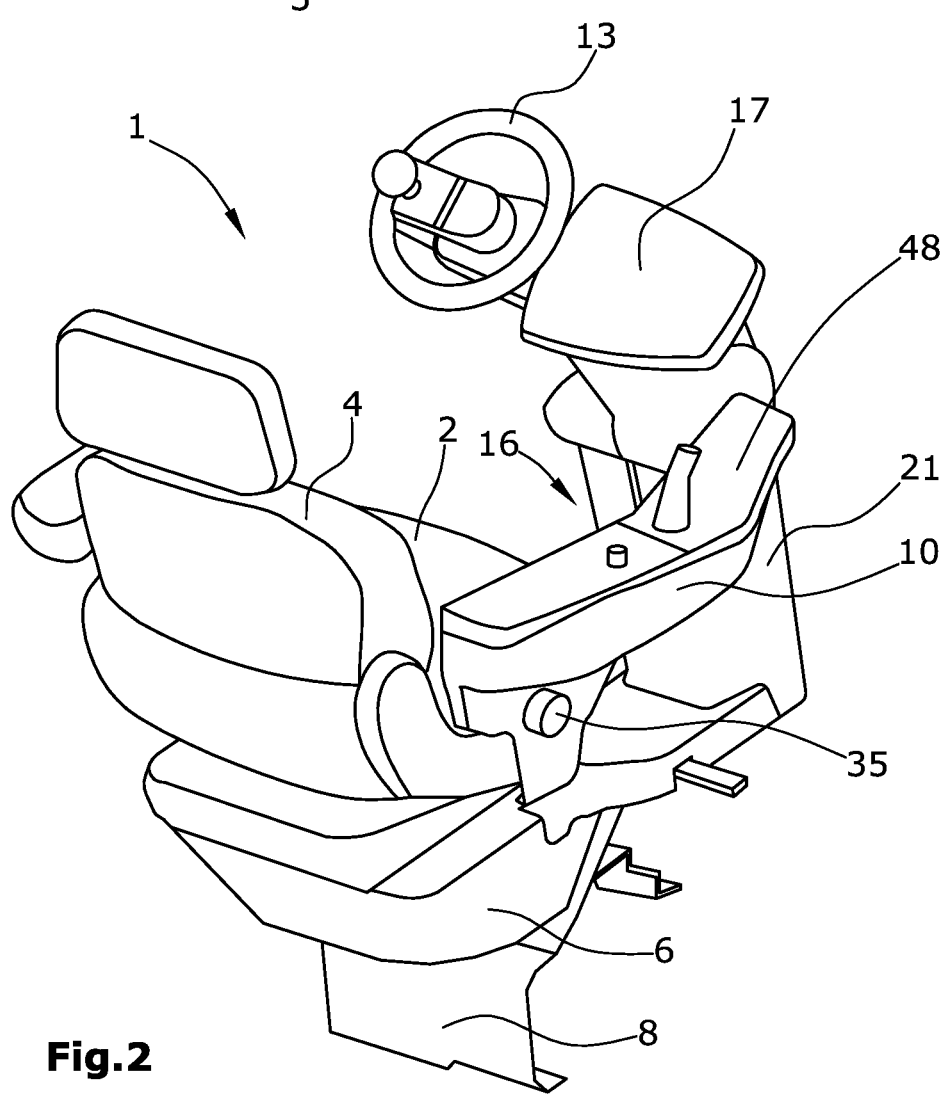

As can be inferred from FIG. 2, a steering column 21 movable together with the seat 1 and featuring a steering device 13, as well as a dashboard 17 are attached to the seat 1.

An armrest 10 attached to the seat console 6 by means of an armrest support 8 is preferably provided on the right-hand side of the seat 1, where said armrest 10 features operating and indication elements 48 and may also accommodate, for example, a control device 16 for the seat adjustment and/or an additional display.

The operating elements may be comprised, for example, of a mini joystick which can be used to manually control an electrical seat rotation feature.

Figure 3A:
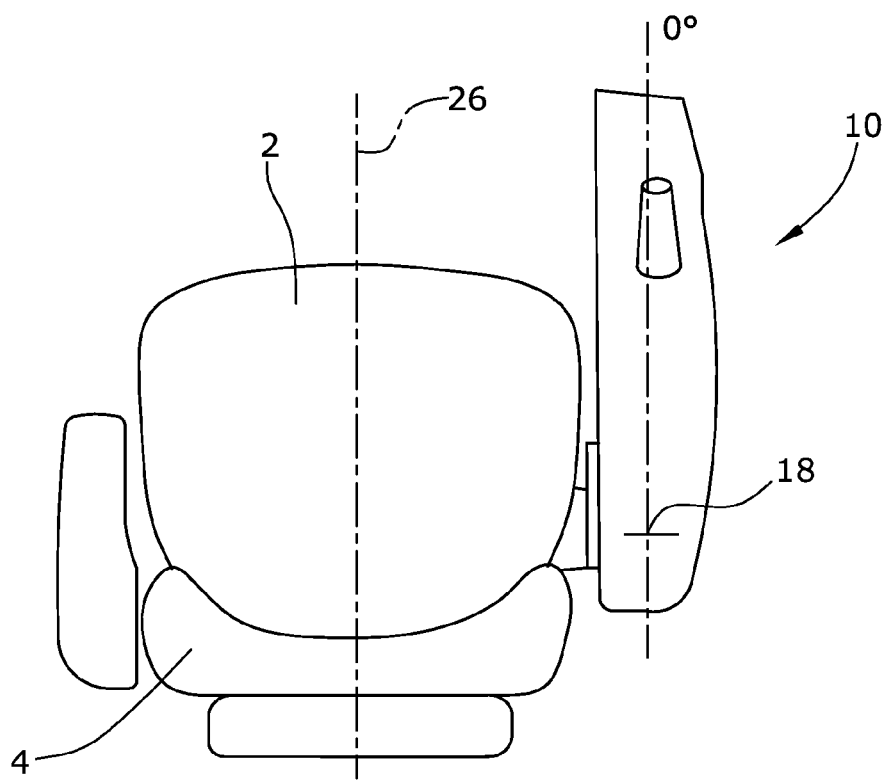
Figure 4A:
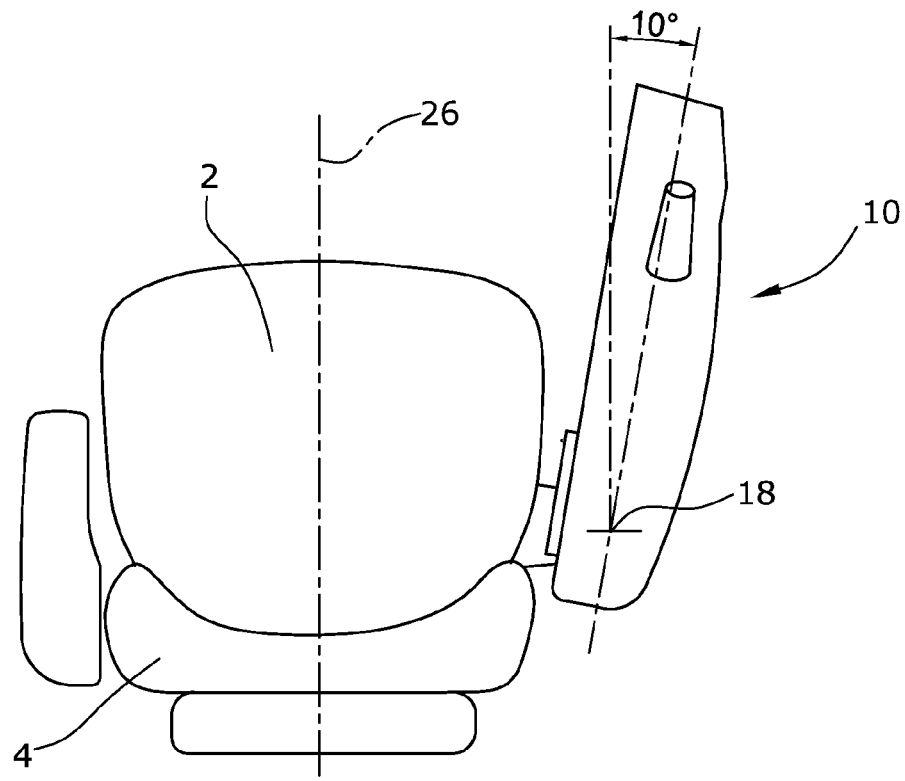
Figure 5A:
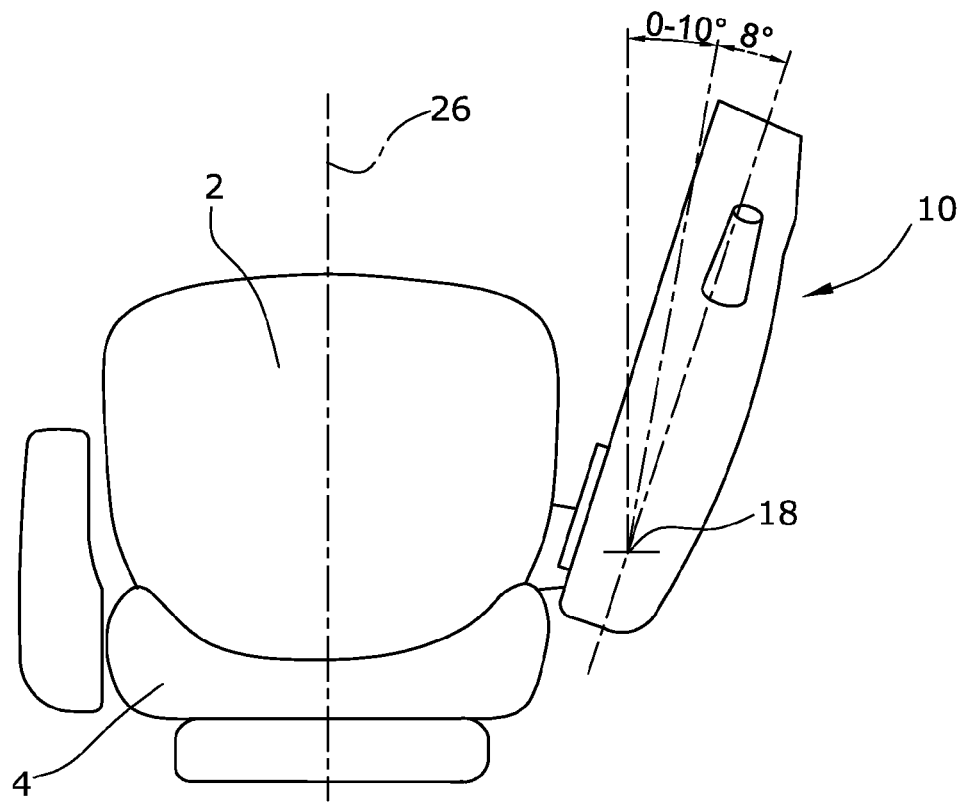
Figure 8:
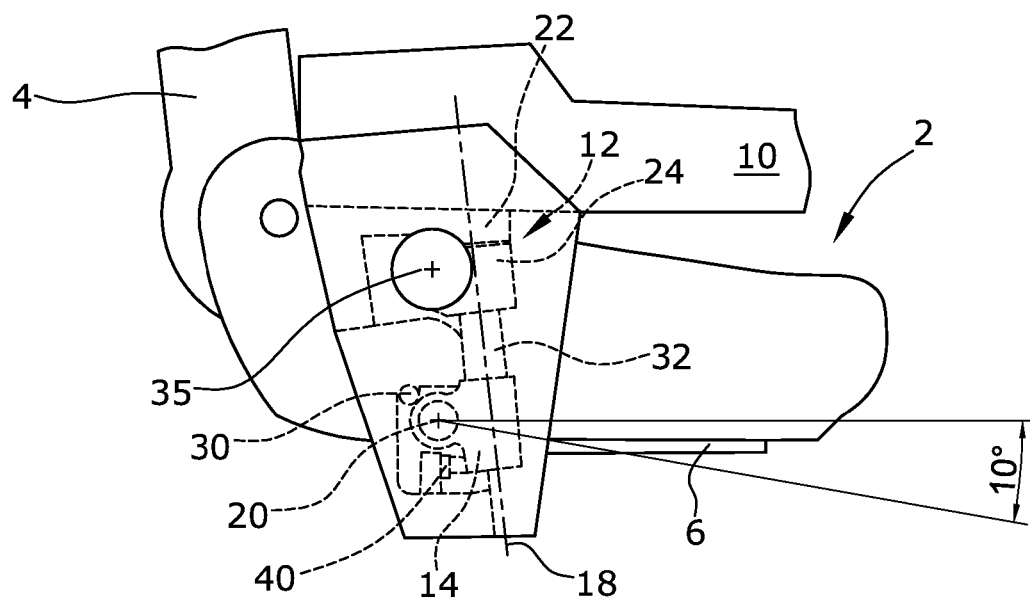

FIGS. 3a, 4a and 5a show top views of the armrest 10 in different angular positions. In this arrangement, the angle specifications of the lateral pivoting angle (or its projection onto a horizontal plane, respectively) refer to a parallel to the vertical central axis 26 which extends centrally to the seat surface 2 and the seat backrest 4. The armrest 10 can be pivoted about a first axis 18 which may extend slightly inclined nearly parallel to the seat backrest 4 and, as can be inferred from FIG. 8, can be adjusted in inclination.

FIG. 3a shows the armrest 10 in a basic setting of 0° in which the armrest 10 extends essentially parallel to the vertical central plane 26.

FIG. 4a shows the armrest 10 in an angular position of 10° which is also adjustable as a basic setting. The basic setting for the pivoting angle of the armrest can preferably be adjusted continuously in the range between 0° and 15°, preferably between 0° and 10°.

FIG. 5a shows a pivoting option of the armrest 10 beyond the maximum angle of the basic setting. This means that the armrest 10 can be additionally pivoted from its basic setting at a pivoting angle of, for example, between 0° and 10°, about up to, for example, 8°. This enables the driver to briefly pivot the armrest further in order to look down on the side of the armrest 10, for example, along the vertical outer edge of the construction machine or road roller.

It is understood that the armrest 10 may also be mounted on the left side of the seat in particular for countries with left-hand traffic.

FIGS. 3b to 5b show the armrest support with a first adjustable connection unit 12 which is connected to the armrest 10, and a second adjustable connection unit 14 which is connected with the seat console 6, with the seat console 6 being shown in a schematic illustration only.

Figure 3B:
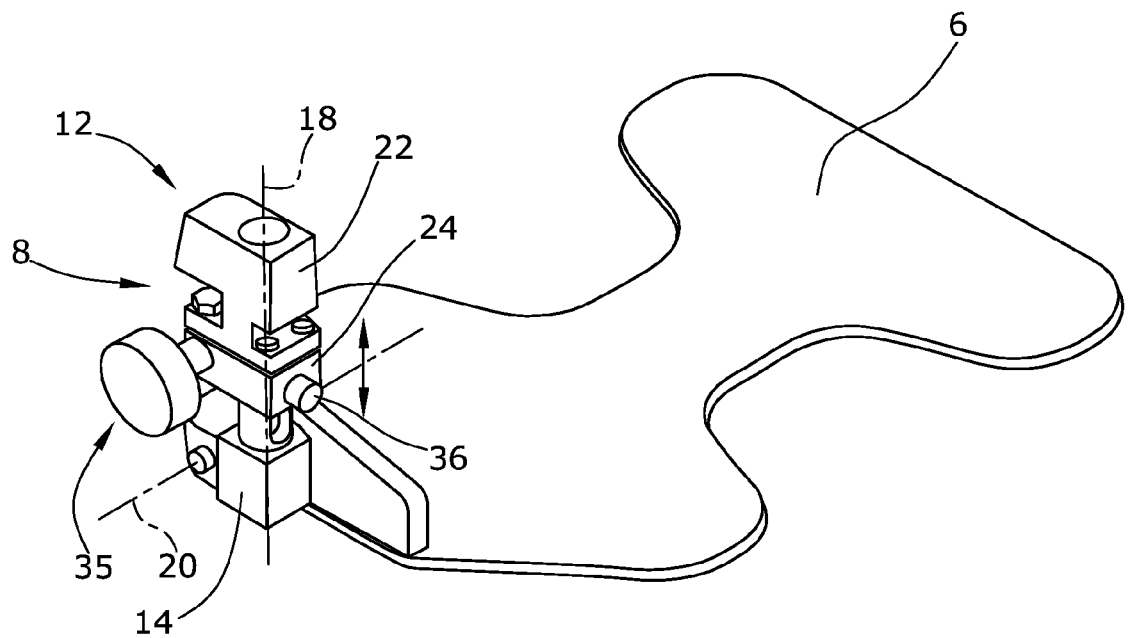
Figure 4B:
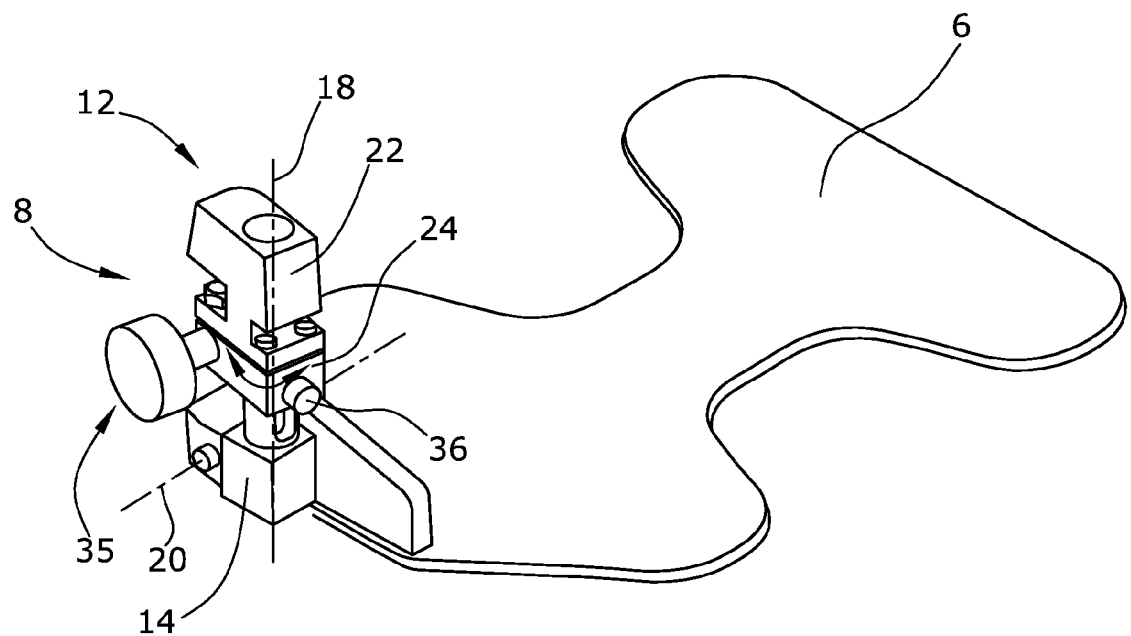
Figure 5B:
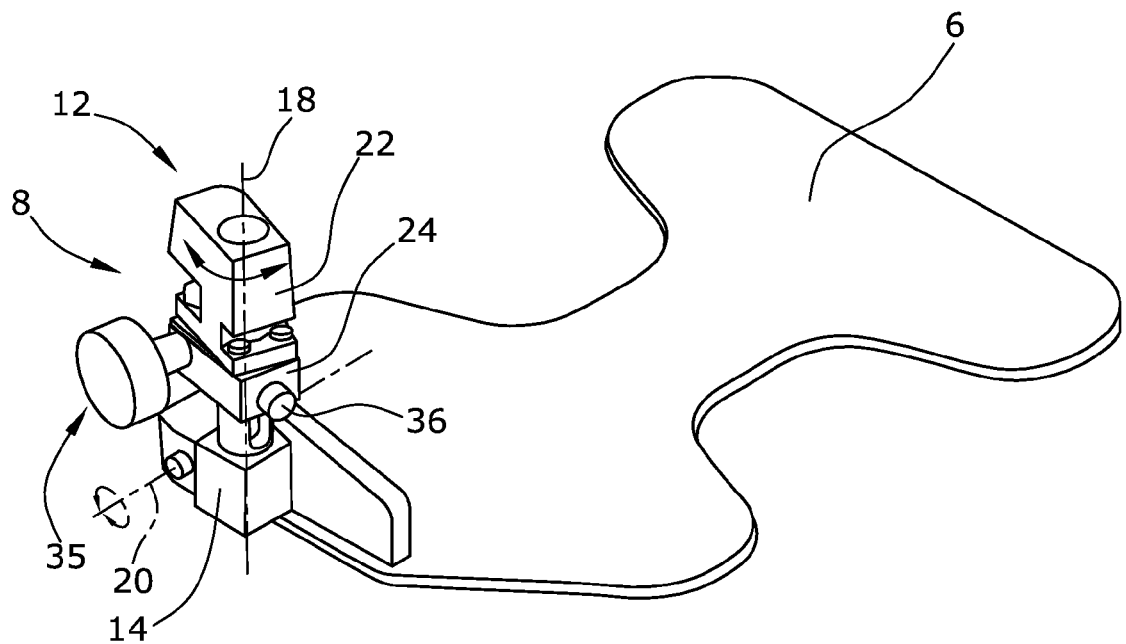

FIGS. 3b, 4b and 5b show the armrest support 8 in the pivoting angle settings of the armrest 10 corresponding to the FIGS. 3a, 4a and 5a respectively.

Figure 6:
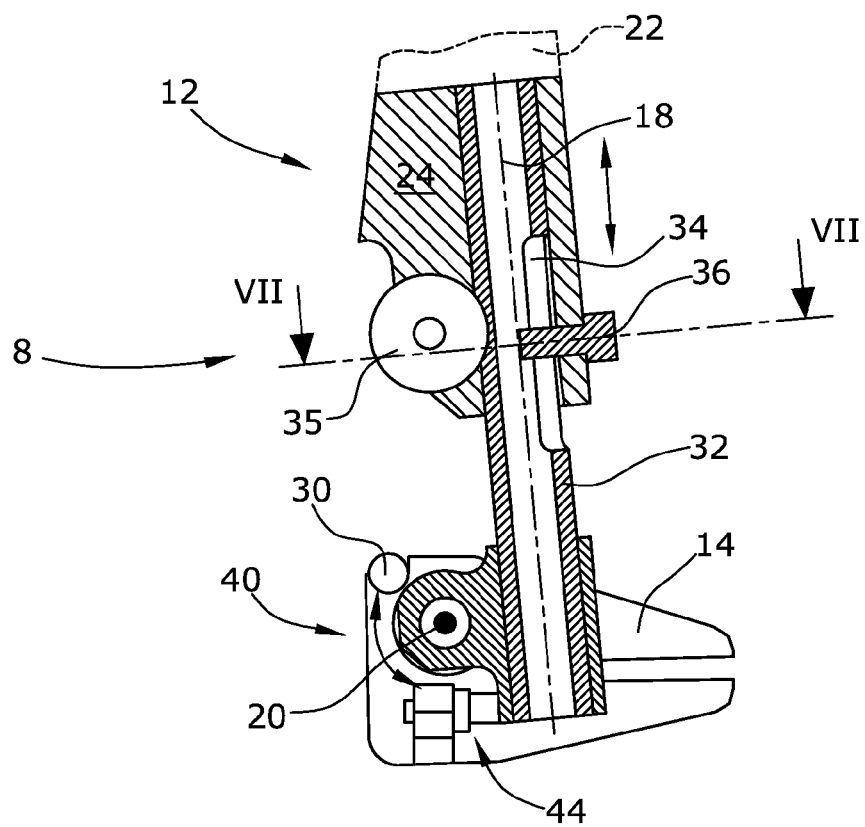
Figure 7:
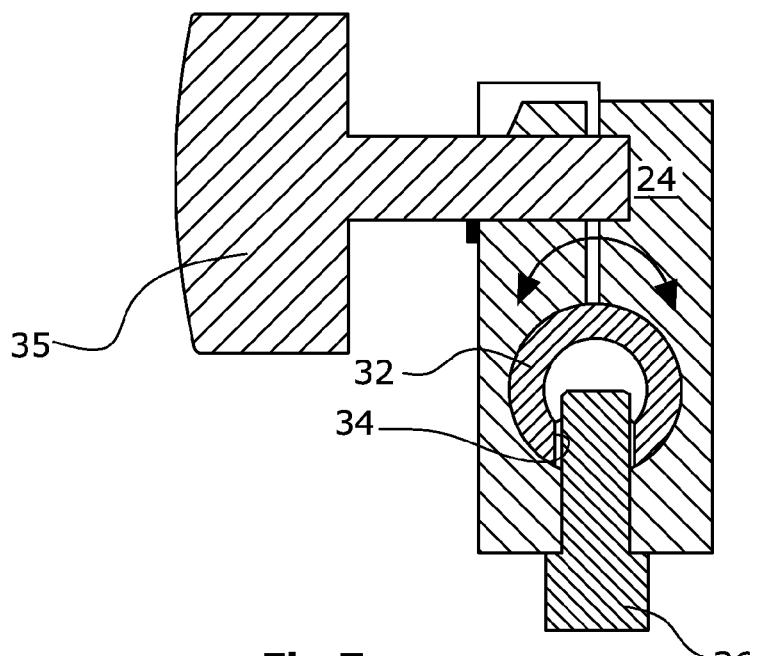

A vertical longitudinal section and horizontal cross-section of the armrest support 8 are shown in FIGS. 6 and 7.

As can be inferred from FIG. 6, a cylindrical part 32, preferably a hollow cylinder, is attached to the connection unit 14 in a non-rotatable fashion, the first connection unit 12 being positioned at the upper end of said cylindrical part 32.

In connection with the cylindrical part 32, the first connection unit 12 enables the basic setting of the pivoting angle for the armrest 10, the further pivoting of the armrest as shown in FIGS. 5a and 5b, and the height adjustment of the armrest 10.

Further pivoting of the armrest 10, as shown in FIGS. 5a and 5b, is implemented by means of an upper part 22 pivotable, relative to a lower part 24 of the connection unit 12, about the axis 18 or an axis extending essentially parallel to the same and connected to the armrest 10 in a permanent fashion. In this design, the upper part 22 can be pivoted about an angle of preferably up to 8° relative to the lower part and, namely, either against a spring force so that the armrest 10 pivots back into the basic setting by itself, or by means of a snap-in element which enables the armrest 10, starting from the basic position, to snap in reversibly in the extended pivoting angle.

The lower part 24 of the connection unit 12 encompasses the cylindrical part 32, which is preferably designed in a rotatable fashion as a hollow cylinder, and can, in different rotary positions relative to the cylindrical part 32, be locked in a desired rotary position by means of a handling device, for example, a rotary knob 35.

In this design, the rotary position is limited to, for example, a maximum pivoting angle of 10°, which corresponds to the pivoting angle of the armrest 10 in its basic position, by means of a limiting element 36 engaging into an oblong hole 34 of the cylindrical part 32. In this design, the adjustable angle is determined by the width of the oblong hole 34 in the cylindrical part 32 and the diameter of the limiting element 36, for example, in the form of a pin.

When the clamping sleeve formed by the lower part 24 is unlocked by means of the rotary knob 35, the connection unit 12 can be adjusted not only with regard to the pivoting angle using the lower part 24 but also with regard to the height adjustment along the oblong hole 34. This means that, with the adjusting knob 35, the basic setting for the height and for the pivoting angle of the armrest 10 can be selected and locked at the same time. The extent of the height adjustment is dependent on the length of the oblong hole 34 and can amount to, for example, 10 cm.

Figure 9:
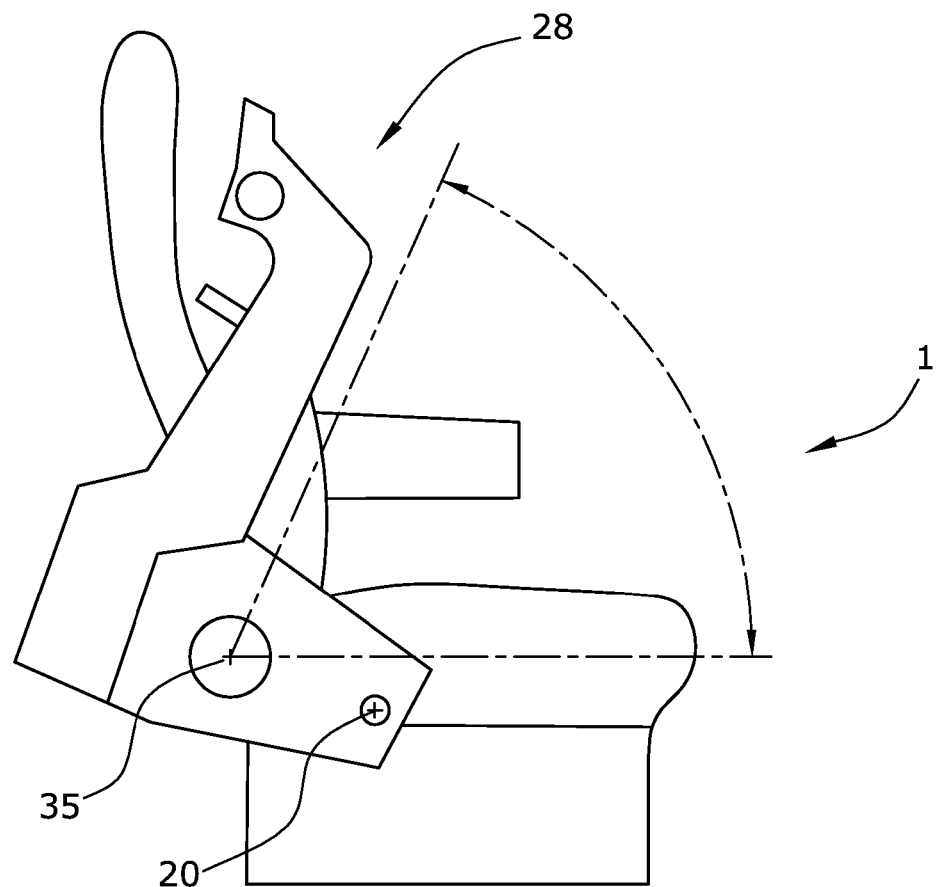

The adjustable connection unit 14 connected to the seat console 6 is mounted in the joint 40 to pivot, relative to the seat console 6, about a horizontal axis 20 which extends preferably orthogonally to the central plane 26, in which case pivoting of the armrest support 8 about the axis 20 enables folding-up of the armrest 10 into a folded-up resting position 28 as can be inferred from FIG. 9. A bolt 30 serves as a stop for pivoting the armrest 10 towards the rear.

Furthermore, the inclination angle of the first axis 18 and thus of the armrest 10 can be enabled at the joint 40 by means of an inclination adjustment device 44. The inclination adjustment device 44 forms an adjustable stop for the connection unit 14.

The invention claimed is:

1. A seat apparatus for a driver of a construction machine, comprising:
    a seat console;
    a seat surface supported from the seat console;
    a seat backrest supported from the seat console;
    at least one armrest; and
    an armrest support configured to support the armrest in an adjustable basic position with the armrest located next to the seat surface and extending frontwards, the armrest support including:
        at least one first adjustable connection unit connecting the armrest support to the armrest; and
        at least one second adjustable connection unit connecting the armrest support to the seat console.

2. The apparatus of claim 1, wherein:
    the seat surface and the seat backrest have a vertical central plane in a longitudinal direction ; and
    the adjustable basic position of the armrest provided by the armrest support via at least one of the first and second connection units includes an adjustable basic setting of a lateral pivoting angle of the armrest about a first axis located in an area of an end of the armrest closest to the seat backrest, the axis being parallel to the vertical central plane.

3. The apparatus of claim 2, wherein:
    one of the connection units provides an additional laterally outward pivotal movement of the armrest beyond the basic position of the armrest.

4. The apparatus of claim 3, wherein:
    the one of the connection units provides the additional laterally outward pivotal movement against a restoring force biasing the armrest back to the basic position.

5. The apparatus of claim 3, wherein:
    the one of the connection units provides the additional laterally outward pivotal movement to a snap in extended position.

6. The apparatus of claim 1, wherein the first connection unit includes:
    a lower part attached to an upper end of the armrest support and configured to provide the adjustable basic position of the armrest, the adjustable basic position including an adjustable basic setting of a lateral pivoting angle of the armrest; and
    an upper part attached to the armrest and configured to provide an additional laterally outward pivotal movement of the armrest beyond the adjustable basic position of the armrest.

7. The apparatus of claim 6, wherein:
    the adjustable basic setting of the lateral pivoting angle is permanently adjustable in a range of from 0° to 15°.

8. The apparatus of claim 6, wherein:
    the adjustable basic setting of the lateral pivoting angle is permanently adjustable in a range of from 0° to 10°.

9. The apparatus of claim 6, wherein:
    the additional laterally outward pivotal movement is up to 10° beyond the adjustable basic position.

10. The apparatus of claim 6, wherein:
    the additional laterally outward pivotal movement is up to 8° beyond the adjustable basic position.

11. The apparatus of claim 1, wherein;
    the seat surface and the seat backrest have a vertical central plane in a longitudinal direction ; and
    the second connection unit provides pivotal movement of the armrest support about an axis extending essentially orthogonally to the central plane until reaching a folded-up resting position.

12. The apparatus of claim 11, wherein:
    the pivotal movement of the armrest support to the folded-up resting position is through an angle in a range of from about 70° to about 90°.

13. The apparatus of claim 1, wherein:
    the armrest is adjustable in inclination via the second connection unit.

14. The apparatus of claim 13, wherein:
    the armrest is inclinable downwards by an angle up to 15°.

15. The apparatus of claim 1, wherein:
    the first connection unit connects the armrest to the armrest support such that the armrest is height adjustable.

16. The apparatus of claim 1, wherein:
    the armrest support includes a cylindrical part; and
    one of the connection units includes a clamping sleeve enclosing the cylindrical part and slidable relative to the cylindrical part to adjust a height of the armrest, and a handle movable to lock the clamping sleeve to the cylindrical part.

17. The apparatus of claim 16, wherein:
    the adjustable basic position of the armrest provided by the armrest support includes an adjustable basic setting of a lateral pivoting angle of the armrest about a first axis of the cylindrical part;
    the cylindrical part has an oblong hole formed in the cylindrical part and extending in the direction of the first axis; and
    the clamping sleeve includes a limiting protrusion extending into the oblong hole, the engagement of the limiting protrusion with the oblong hole limiting both height adjustment and lateral pivoting angle adjustment of the armrest.

18. The apparatus of claim 17, wherein:
    the one of the connection units including the clamping sleeve is the first adjustable connection unit.

19. The apparatus of claim 1, wherein;
    the second connection unit provides pivotal movement of the armrest support about an inclination axis to allow inclination of the armrest, and the second connection unit includes an adjustable inclination support.

20. The apparatus of claim 1, in combination with a road roller machine.

* * * * *